Patented Dec. 5, 1922.

1,437,487

UNITED STATES PATENT OFFICE.

ARTHUR BIDDLE, OF TRENTON, NEW JERSEY, ASSIGNOR TO UNITED PRODUCTS CORPORATION OF AMERICA, A CORPORATION OF DELAWARE.

CAOUTCHOUC COMPOSITION.

REISSUED

No Drawing. Application filed July 19, 1920. Serial No. 397,173.

*To all whom it may concern:*

Be it known that I, ARTHUR BIDDLE, a citizen of the United States, and a resident of the city of Trenton, county of Mercer, in the State of New Jersey, have invented certain new and useful Improvements in Caoutchouc Compositions, of which the following is a specification.

The invention relates to a composition of matter or a compound of the nature of rubber, gutta-percha, balata and like materials and adapted for use in like manner and for like purposes.

Among the objects of the invention is to incorporate or combine casein, or compositions containing casein as an essential element, with a rubber-like substance such as rubber, gutta-percha, balata and the like, or compositions thereof, and in the form or state in which they may exist as in the latex, crude or refined forms or conditions.

Another object of the invention is to make a compound or composition of matter of the nature above mentioned which will be adapted for use in various arts, as for example, in the manufacture of tires, mats, linoleum substitutes, flooring, pool and billiard balls, bowling balls, tennis balls, belting, shoe compositions, pavements, insulating materials, household and personal articles, chemical apparatus and equipment, buttons, flexible adhesive and coating, waterproofing compositions made by dissolving the rubber, gutta-percha, balata and the like in a suitable solvent and incorporating with it casein or casein glue, gaskets, washers, bumpers, machinery parts, ebonite and vulcanite compositions, and any other article adapted to be made therefrom.

By the use of the term "latex" herein is meant any of the milky or laticiferous saps or juices obtained from plants and the like, and as are contained in rubber, gutta-percha, balata and similar substances, as well as including the various combined salts, minerals, proteins, resins and other natural substances usually found therein.

The term "caoutchouc" as used in this disclosure is intended to include rubber, gutta-percha, balata, rubber substitutes and similar substances having like properties, as well as compositions or mixtures thereof, and such as may be obtained from the above mentioned latex after exposure to the air or subjection to oxidation and to heat, and, moreover, whether existing in the semi-solid or solid form or in the crude or refined state. Inasmuch as these various substances have essentially substantially identical physical and chemical properties and are regarded as equivalents, differing only in the proportions of resinous and proteinous matter contained therein, they may be spoken of generically by the term "caoutchouc". Under the specific mention of rubber, gutta-percha, and balata is to be understood, also that the same may be solid portions or parts of latexes thereof.

The term "casein" is intended to be generic to and to comprehend any or all caseinous, albuminous and proteinous matters in which casein or an equivalent element is an essential ingredient, or any mixture or composition thereof, and as may be obtained from milk, butter-milk, legumens, lentils, as well as may be found combined and mixed with various substances such as, alkalies and other chemicals to form casein glues, water, oils, glycerin, tars, resins, waxes and the like. Such casein may be used in the pure soluble or insoluble state or in the plastic, semi-plastic, dry or powdered form as may be more convenient for the purposes desired.

Inasmuch as no two articles produced in accordance with this invention would have the ingredients thereof in exactly the same proportions it is believed that it is non-essential to state any particular proportions of composing the same except as may be exemplified hereinafter.

In the manufacture of rubber and similar materials it is usual to first wash the rubber, as received in its crude form, to clean it of all resins and foreign matters, and then to work it between heavy rolls or calenders, and it is during the rolling process that certain ingredients, such as sulphur, sulphur compounds, and metallic compositions, as well as various fillers, are added to make the composition or compound desired.

The invention therefore involves the above processes and has for an object the addition to the rubber, while undergoing such operation, casein, or caseinous materials or substances equivalent thereto, preferably in the powdered form, at the stage of operation where the materials are being worked upon between the calender rolls. In some instances, if it be desired, the casein may be added to the rubber without other ingredients. The whole mass is then shaped in the form desired and vulcanized to suit the requirements of the articles made therefrom.

As an example of one composition made in accordance with my invention the following is referred to and is found suitable for certain purposes. Such composition may have in the proportions by weight 30 parts of rubber, 5 parts of sulphur, 40 parts of zinc oxid, 5 parts of lamp black, 5 parts of litharge, 5 parts of antimony sulphide, and 10 parts of casein. It will be observed, however, that any of the above ingredients such as zinc oxid, lamp black, litharge, and antimony sulphide, may be omitted and the proportions thereof changed as desired depending upon the purposes to which the composition is to be put. The important feature of the compound is the addition of casein or simlar material with the rubber or rubber-like material with or without whatever other ingredients may be found of value to make a new and useful compound.

The following substances are suitable to be incorporated with the casein or compositions thereof and the rubber or rubber-like materials as above mentioned,—sulphur, zinc oxid metallic dust, preferably of zinc, antimony penta-sulphide, antimony tri-sulphide, chalk, clay, magnesium oxid, magnesium carbonate, lime, plaster of Paris, gypsum, silica, fuller's earth, red oxid of iron and other oxids, plumbago, asbestos powder, mica, white lead, lamp black, asphalt, bitumen, magnesium silicate or magnesium fluo-silicate, litharge, barytes, lithopone, calcium-carbonate, bony substances such as fish and animal bones, wood pulp and wood pulp liquor products, such as dried glutin, and various oils found either in the natural, vulcanized or oxidized state, as castor oil, linseed oil, rape oil, turpentine or turpene oil, fish oil, coal tar, petroleum tar, wood tar or extracts or distillates thereof, rosin or resinous matters, parrafine wax, and other materials such as leather or leather dust, kauri gum or other gums, such as gum resins, Japanese wax and beeswax or other powdered materials such as fish glue, ammonium carbonate or compounds of ammonia, sodium fluoxid, sodium silicate, cork, cloth fibers, cotton, petroleum oils, glycerin, paper, shellac.

The casein may be dissolved and added to the various kinds of latexes. Such mixture when subjected to heat and treated with acids and acid salts tend to coagulate or precipitate. By mixing casein with latex, a more efficient and satisfactory incorporating of the whole is obtained when coagulated or precipitated as above stated. The casein or caseinous substances, in the various forms herein described, may be worked into the rubber materials such as rubber, gutta-percha, balata and tars, rosin and resinous matters to form a rubber substitute or substitutes particularly adapted for insulating compounds. Balata may not be as useful due to its scarcity but when used is of especial use in the belting industry.

The value of using casein in compositions of rubber, gutta-percha, balata and the like lies in its insolubility under certain conditions and in its flexibility when combined with non-evaporating substances like oils and tars. Casein or caseinous matters combine readily with lime and other chemicals which have adhesive properties and are especially useful in a composition or compound used as waterproofing compositions. Moreover, they take very readily to vulcanizing in any of the present methods of vulcanization wherein pure sulphur, sulphur compounds, sulphur baths and the cold sulphur process are usually employed. Vulcanization tends to harden and thus to waterproof casein under certain conditions of temperature and pressure.

While I have herein described the mode of combining certain ingredients to make the compound in accordance with my invention it is to be understood, however, that the invention is not limited to the particular ingredients or the mode of treatment herein described, but other ingredients having substantially the same or similar characteristics may be employed in substantially the same manner without departing from the spirit of the invention and the scope of the appended claims.

Having thus described my invention, what I claim and desire to protect by Letters Patent of the United States is:

1. A composition of matter comprising a caoutchouc latex and a casein.

2. A composition of matter comprising caoutchouc latex, sulphur and a caseinous substance.

3. A composition of matter comprising caoutchouc latex, sulphur, casein, and filling material.

In witness whereof, I have hereunto set my hand this 17th day of July, 1920.

ARTHUR BIDDLE.